United States Patent
Fujita et al.

(10) Patent No.: US 9,266,480 B2
(45) Date of Patent: Feb. 23, 2016

(54) STRUCTURE OF TERMINAL PORTION OF PRODUCT WITH COVER

(71) Applicant: TOYODA GOSEI CO., LTD., Kiyosu-shi, Aichi-ken (JP)

(72) Inventors: Junichi Fujita, Kiyosu (JP); Shunta Asakuma, Kiyosu (JP); Chiharu Totani, Kiyosu (JP); Minoru Toda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/619,249

(22) Filed: Feb. 11, 2015

(65) Prior Publication Data

US 2015/0266432 A1    Sep. 24, 2015

(30) Foreign Application Priority Data

Mar. 24, 2014 (JP) ................................. 2014-060444

(51) Int. Cl.
*B60R 13/02* (2006.01)
*B60R 21/205* (2011.01)
*B60R 21/215* (2011.01)

(52) U.S. Cl.
CPC ........... *B60R 13/0256* (2013.01); *B60R 21/205* (2013.01); *B60R 21/215* (2013.01)

(58) Field of Classification Search
CPC .. B60R 13/0256; B60R 21/205; B60R 21/215
See application file for complete search history.

(56) References Cited

U.S. PATENT DOCUMENTS

| | | | | |
|---|---|---|---|---|
| 5,476,618 A * | 12/1995 | Ito | ........................ | B29C 44/569 264/126 |
| 5,736,082 A * | 4/1998 | Funato | ................... | B29C 39/126 264/273 |
| 6,158,763 A * | 12/2000 | Dominique | ........... | B60R 21/205 280/728.2 |
| 6,517,101 B1 * | 2/2003 | Bemis | ................... | B60R 21/215 280/728.3 |
| 8,678,458 B2 * | 3/2014 | Filipp | ....................... | B32B 7/08 296/1.08 |
| 9,010,799 B2 * | 4/2015 | Hagl | ................... | B29C 37/0057 280/728.2 |
| 2014/0333052 A1 * | 11/2014 | Fujita | .................. | B60R 21/2165 280/728.3 |
| 2015/0130169 A1 * | 5/2015 | Fujita | .................... | B60R 21/217 280/728.3 |

FOREIGN PATENT DOCUMENTS

JP              64-026413 A       1/1989

* cited by examiner

*Primary Examiner* — Laura Freedman
(74) *Attorney, Agent, or Firm* — Posz Law Group, PLC; David Posz

(57) ABSTRACT

An instrument panel has a substrate and a cover formed by laminating a cushion layer on the back surface of a cover body. A terminal portion of the cushion layer includes a body portion and a peripheral edge portion. The peripheral edge portion is plastically deformed into a compressed state and located around the body portion. The terminal portion of the substrate includes a flat portion and a flange portion. The flange portion surrounds the flat portion in a state of protruding to the top side. The cover is adhered onto the terminal portion of the substrate by adhering the body portion onto the flat portion and adhering the peripheral edge portion onto the flange portion. The peripheral edge portion is adhered onto the flange portion in a state where the peripheral edge portion is folded along the top surface and a side surface of the flange portion.

6 Claims, 5 Drawing Sheets

STRUCTURE OF TERMINAL PORTION OF PRODUCT WITH COVER

BACKGROUND OF THE INVENTION

The present invention relates to a structure of a terminal portion of a product with a cover.

As an interior part such as an instrument panel and a console of an automobile, an interior part formed by adhering a cover 55 onto a substrate 51 (hereinafter, referred to as a "covered product 50"), as shown in FIG. 8, is known. The cover 55 includes a cover body 56 and a cushion layer 57 laminated on the back side of the cover body 56. In FIG. 8, a part of the cushion layer 57 is omitted. In a terminal portion of the covered product 50, the cover 55 is adhered onto a terminal portion 52 in a state of being compressed and folded along the top surface, the side surface, and the back surface of the terminal portion 52 of the substrate 51. That is, the cover 55 is adhered onto the terminal portion 52 in a state of covering the back surface of the terminal portion 52 (for example, see Japanese Laid-Open Patent Publication No. 64-26413). The covered product 50 is arranged at a location near an adjacent component 60 indicated by a long dashed double-short dashed line in FIG. 8.

However, when the cover 55 having the cushion layer 57, as described above, is adhered to be compressed and folded along the top surface and the side surface of the terminal portion 52 of the substrate 51, the cover 55 is bulged at a corner portion 50a at the top side of the covered product 50 due to the elastic restoring force of the cushion layer 57, and the cover 55 is curved with a large radius of curvature (for example, 5 mm or greater). As a result, the boundary with the adjacent component 60 in the covered product 50 is blurred, and thus, the ornamental quality is impaired.

Therefore, it is considered that the size of the radius of curvature of the corner portion 50a should be reduced. In a covered product 50 shown in FIG. 9, the terminal portion 52 of the substrate 51 includes a flat portion 53 and a flange portion 54. The flange portion 54 surrounds the flat portion 53 in a state of protruding to the top side relative to the flat portion 53. Then, the cushion layer 57 of the cover 55 is adhered onto the flat portion 53 of the terminal portion 52. However, only the cover body 56 of the cover 55 is adhered onto the flange portion 54. In the covered product 50, the cushion layer 57 is not folded along the flange portion 54. Therefore, the radius of curvature of the curved cover body 56 is small at the corner portion 50a on the top side of the covered product 50, and thus, the boundary with the adjacent component 60 of the covered product 50 is clearly visible.

However, in the covered product 50 in FIG. 9, when touched, for example, with a finger, the corner portion 50a would feel hard, and hence, tactile sensation is impaired. The reason for this is that a hard flange portion 54 is located on the back side of the cover body 56. Further, during manual work of adhering the cover 55 to the substrate 51, a gap G1 is generated to some degree between the cushion layer 57 and the flange portion 54. When the cover body 56 having a small thickness is used, a part of the cover body 56, that is, a part in which the gap G1 is present on its back side, is pushed by a finger, the part is expanded, and thus, the part is loosened or indented toward the gap G1, which may degrade the appearance.

The above-described problem may be resolved by using a cover body 56 having a large thickness, which, however, would increase the cost. Further, when the covered product 50 constitutes a part of an airbag device and is pressed by an airbag that is deployed and inflated, it is necessary to break the cover body 56. Thus, it is difficult to respond to this request when the cover body having a large thickness and having no tear line is used.

SUMMARY OF INVENTION

An objective of the present invention is to provide a structure of a terminal portion of a product with a cover with which it is possible to improve the tactile sensation and the appearance.

To achieve the foregoing objective and in accordance with one aspect of the present invention, a structure of a terminal portion of a covered product is provided. The structure is applied to a product that includes a substrate and a cover formed by laminating a cushion layer on a back surface of a cover body. The cover is adhered onto a top surface of the substrate. A terminal portion of the cushion layer includes a body portion not plastically deformed into a compressed state and a peripheral edge portion plastically deformed into a compressed state. The peripheral edge portion is located around the body portion. A terminal portion of the substrate includes a flat portion and a flange portion. The flange portion surrounds the flat portion in a state of protruding to the top side relative to the flat portion. The cover is adhered onto the terminal portion of the substrate by adhering the body portion of the cushion layer onto the flat portion of the substrate and adhering the peripheral edge portion of the cushion layer onto the flange portion of the substrate. The peripheral edge portion is adhered onto the flange portion in a state where the peripheral edge portion is folded along at least a top surface and a side surface of the flange portion.

In the terminal portion of the product with a cover of the above configuration, in which the cover is adhered onto the substrate, the body portion not plastically deformed into a compressed state in the terminal portion of the cushion layer is arranged between the flat portion of the substrate and the cover body. The body portion imparts a necessary elasticity to the terminal portion of the covered product. Further, the peripheral edge portion plastically deformed into a compressed state in the terminal portion of the cushion layer is arranged between the corner portion at the top side of the flange portion in the substrate and the cover body. The peripheral edge portion is plastically deformed into a compressed state, and thus, the cover is unlikely to be bulged at the corner portion at the top side of the flange portion and curved with a large radius of curvature. As a result, the boundary with an adjacent component in the covered product is clearly visible.

Further, the peripheral edge portion has a measurable elasticity, although compressed. Thus, when touched, for example, with a finger, a portion corresponding to an area near the corner portion at the top side of the flange portion in the cover would feel soft as compared to a case where there is no cushion layer (peripheral edge portion).

Further, the peripheral edge portion in a compressed state compensates for the rigidity of the cover body. Thus, even when the cover is pushed, for example, with a finger between the flange portion and the body portion, the cover body is less likely to be expanded and therefore is less likely to be loosened or indented.

DETAILED DESCRIPTION OF THE PREFERRED EMBODIMENTS

A structure of a terminal portion of a product with a cover according to one embodiment will now be described with reference to FIGS. 1 to 5.

Description will be provided by using an instrument panel, which is an automobile interior part, as an example of the product with a cover.

Figure 1:
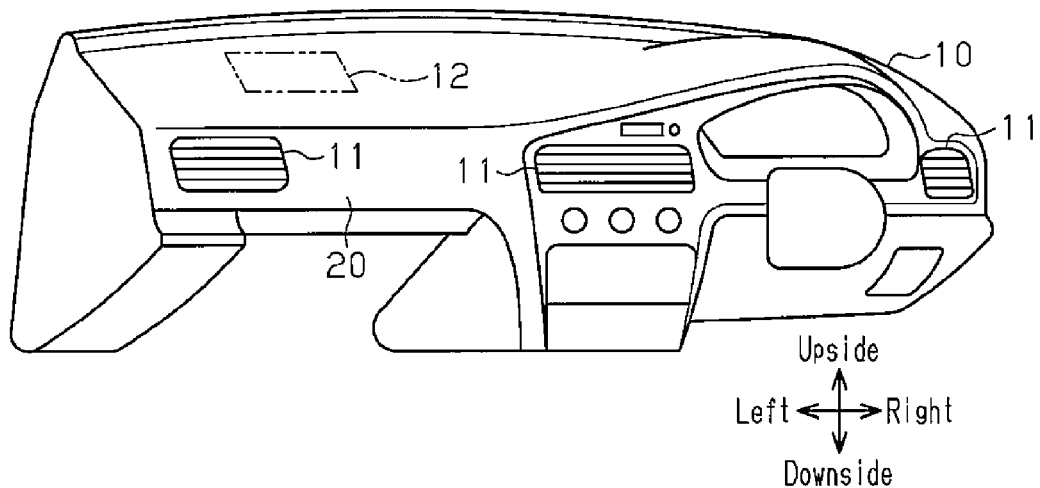
FIG. 1 is a perspective view of an instrument panel to which a structure of a terminal portion of a product with a cover according to one embodiment is applied.

As shown in FIG. 1, an instrument panel 10 (hereinafter, simply referred to as "panel 10") is arranged in front of the front seats (the driver's seat and the front passenger seat) of an automobile. Further, the automobile is provided with an airbag device (not shown) for the front passenger seat, which is designed to protect a passenger from impact by deployment and inflation of an airbag in front of the passenger seated on the front passenger seat when the impact is applied from the front. A part of the panel 10 forms an airbag door 12, which is a part of the airbag device. The airbag door 12 is opened toward the front passenger seat as a result of being pressed by the airbag that is deployed and inflated when the airbag device is activated, and defines an opening that permits the airbag to deploy.

An air-conditioning register 11 is assembled in, for example, a central portion and both side portions of the panel 10 in the vehicle width direction. The air-conditioning register 11 is used for changing the direction into which air-conditioning air fed from an air conditioner is blown into the passenger compartment or blocking the blow of the air-conditioning air into the passenger compartment. In the present embodiment, the air-conditioning register 11 is an adjacent component of the panel 10.

Figure 2:
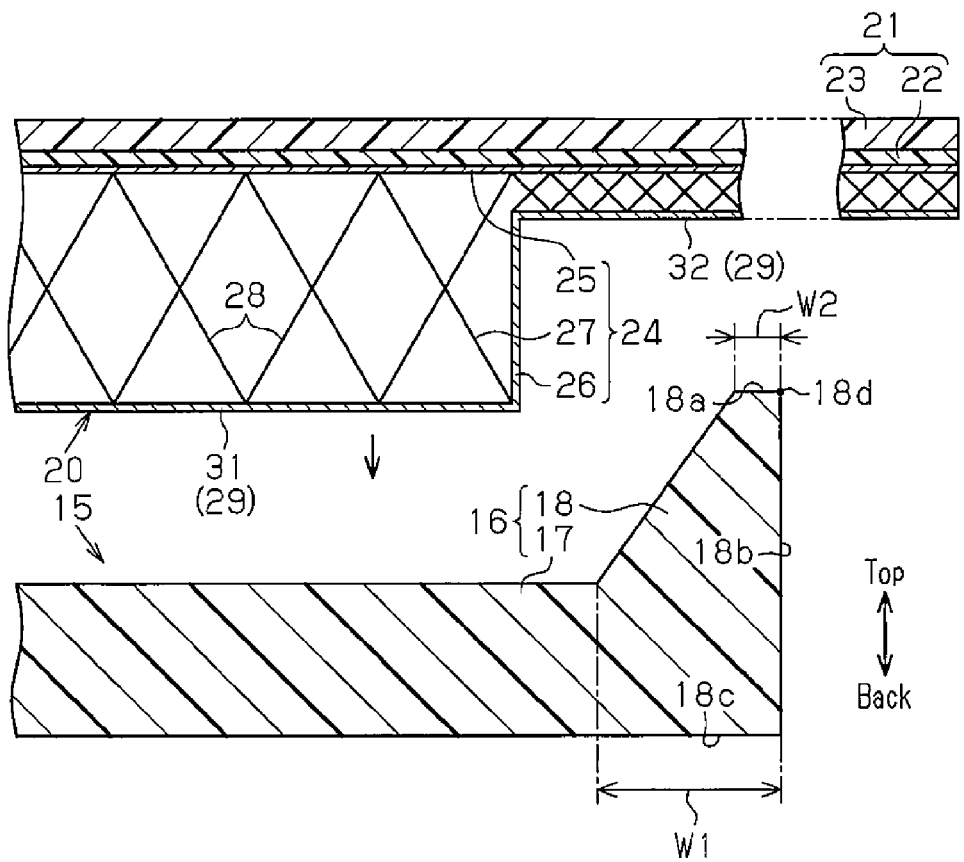
FIG. 2 is a partial cross-sectional view showing a state before a cover is adhered onto a substrate in the embodiment in FIG. 1.
Figure 3:
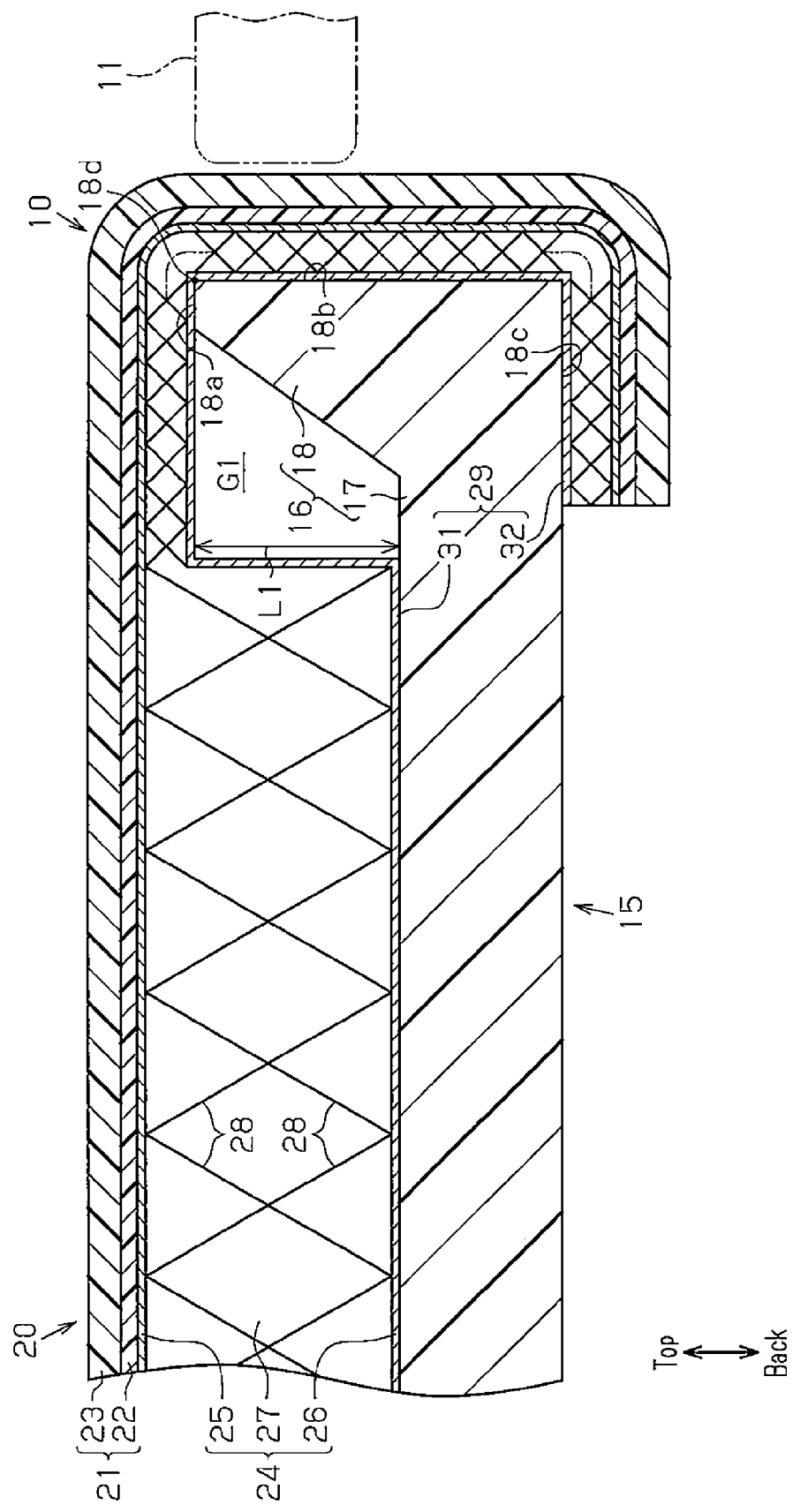
FIG. 3 is a partial cross-sectional view showing the structure of a terminal portion of an instrument panel in the embodiment in FIG. 1.

As shown in FIGS. 2 and 3, the panel 10 includes a substrate 15 as a core member, and a cover 20 adhered onto the top surface of the substrate 15.

The substrate 15 is made of a plastic such as thermoplastic olefin (TPO) and polypropylene, and formed by injection molding. A terminal portion 16 of the substrate 15 includes a flat portion 17 and a flange portion 18. The flange portion 18 surrounds the flat portion 17 in a state of protruding to the top side relative to the flat portion 17. The flange portion 18 has a shape reducing in width toward the distal end. In the flange portion 18, a width W1 of a basal end in the portion protruding toward the top side relative to the flat portion 17 is approximately 2.0 mm, and a width W2 of a distal end is approximately 0.5 mm.

Further, a protruding length L1 from the flat portion 17 in the flange portion 18 is set to be smaller than the thickness of a body portion 31 in a cushion layer 24, which will be discussed below. In the present embodiment, the protruding length L1 is set to a value obtained by subtracting the thickness of a peripheral edge portion 32 from the thickness of the body portion 31 in the cushion layer 24.

The cover 20 includes a cover body 21 and the cushion layer 24 laminated on the back surface of the cover body 21. FIG. 2 shows a state where a part of the cover 20 is cut away. The same applies to FIG. 5, which will be discussed below.

The cover body 21 is provided mainly to improve the texture and the tactile sensation of the panel 10. The cover body 21 of the present embodiment is formed of synthetic leather and includes a base fabric layer 22 and a cover layer 23 located on the top surface of the base fabric layer 22. That is, the cover body 21 has a double-layered structure. The base fabric layer 22 is formed by processing a material made of a knitted fabric or a woven fabric of synthetic fibers such as polyester fibers and polyamide fibers. The cover layer 23 constitutes an ornamental surface of the panel 10. The cover layer 23 is formed of polyurethane, for example, and adhered to the base fabric layer 22.

A cover body of a type having a tear line from which the breakage starts when pressed by an airbag that is deployed and inflated generally has a thickness of approximately 1.0 mm. In contrast, the cover body 21 of the present embodiment does not have a tear line. However, the thickness is set to be 0.4±0.1 mm to be broken when the cover body 21 is pressed by the airbag. That is, the thickness of the cover body 21 is set to be approximately half the general thickness of a cover body having a tear line.

Figure 5:
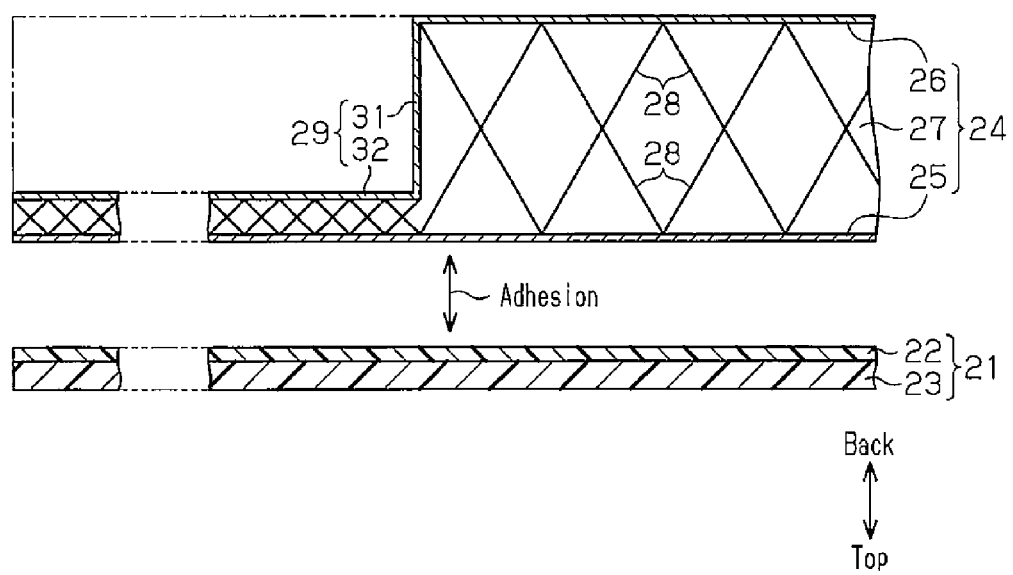
FIG. 5 is a partial cross-sectional view showing a state before the cushion layer is adhered onto a cover body in the embodiment in FIG. 1.

The cushion layer 24 is designed to improve the tactile sensation by imparting a necessary elasticity to the panel 10. The cushion layer 24 of the present embodiment is formed of a three-dimensionally knitted cushion layer. As shown in FIG. 5, the cushion layer 24 is formed of a three-dimensional knitted fabric such as a double-raschel knitted fabric. The cushion layer 24 is adhered, for example, with adhesive, to the back surface of the base fabric layer 22 of the cover body 21.

As shown in FIG. 3, the cushion layer 24 includes a top knitted fabric layer 25, a back knitted fabric layer 26, and a connection layer 27, and is formed, for example, by using a double-raschel knitting machine. The top knitted fabric layer 25 and the back knitted fabric layer 26 are both formed with planar and regular stitches. As yarns that form the top knitted fabric layer 25 and the back knitted fabric layer 26, yarns made of synthetic fibers such as polyester-based fibers, polyamide-based fibers, acryl-based fibers, and polypropylene-based fibers; a natural fiber such as cotton, hemp, and wool; or regenerated fibers such as cuprammonium rayon and lyocell is used.

A knitting construction of the knitted fabric of the top knitted fabric layer 25 and the back knitted fabric layer 26 is not particularly limited. For example, a flat construction (for example, three basic knit constructions of warp knitting, that is, tricot knitting, cord knitting, and atlas knitting) is used. In addition, a rectangular or hexagonal mesh knitted fabric and a marquisette knitted fabric, for example, may be used. The top knitted fabric layer 25 and the back knitted fabric layer 26 may be combined to have identical or different knitting construction.

The connection layer 27 is formed of connecting strands 28 that connect the top knitted fabric layer 25 and the back knitted fabric layer 26. The connecting strands 28 are formed of polytrimethylene terephthalate fibers, polyethylene terephthalate fibers, polybutylene terephthalate fibers, polyamide fiber, polyvinyl chloride fibers, or polyester-based elastomer fiber, for example. In order to maintain a good long-lasting elasticity after repetitive compressions and long-time compressions, it is preferable that polytrimethylene terephthalate fibers be used for at least a part of the connecting strands 28. Further, a fibrous cross-sectional shape preferably has a round cross-sectional shape in view of maintaining a good elasticity for a long time. Monofilament yarns are preferably used for the connecting strands 28 in view of preventing a deviation occurring between the top knitted fabric layer 25 and the back knitted fabric layer 26. In the present embodiment, as the connecting strands 28, connecting strands formed of a polyethylene terephthalate fiber are used. FIG. 3 shows a state where a part of the connection layer 27 (connecting strands 28) is omitted. The same applies to FIGS. 6 and 7B, which will be discussed below.

The connecting strands 28 may form loop-like stitches in the knitted fabrics of the top knitted fabric layer 25 and the back knitted fabric layer 26. Further, the connecting strands 28 may be hooked in a state of being inserted or tacked into both knitted fabric layers 25 and 26. In particular, it is preferable that at least two connecting strands 28 inclined obliquely in the respectively opposite directions to connect the knitted fabric layers 25 and 26 in a crossed or trussed state in view of improving a shape stability of the cushion layer 24 and providing a good elasticity. A truss is a structural form constituted by an aggregation of basic units each of which is a triangle, and a substantially triangular shape is formed by the connecting strands 28 and the top knitted fabric layer 25 or by the connecting strands 28 and the back knitted fabric layer 26. In this case, each connecting strand 28 may be constituted by two yarns in a crossed state or a trussed state. Further, each connecting strand 28 may be constituted by a single yarn, and the connecting strand 28 may be folded by the top knitted fabric layer 25 and the back knitted fabric layer 26, resulting in a seemingly two-yarned construction.

Such a cushion layer 24, which does not have a layered structure, excels in breathability and elasticity, for example. The thickness of the cushion layer 24 may be modified by adjusting the length of the connecting strands 28. In the present embodiment, the cushion layer 24 is formed to have a thickness of 2.5 mm or more.

The reason why a layer (cushion layer 24) between the substrate 15 and the cover body 21 is constituted by the three-dimensionally knitted cushion layer is that the cushion layer 24 has the following characteristics: The cushion layer 24 constituted by the three-dimensionally knitted cushion layer is characterized in having a better stretchability and flexibility than a cushion layer formed of a woven fabric and having a better elasticity than a cushion layer formed, for example, of urethane foam.

A terminal portion 29 of the cushion layer 24 includes the body portion 31, which is not plastically deformed into a compressed state, and the peripheral edge portion 32, which is plastically deformed into a compressed state by hot pressing. The peripheral edge portion 32 is located around the body portion 31.

Figure 4:
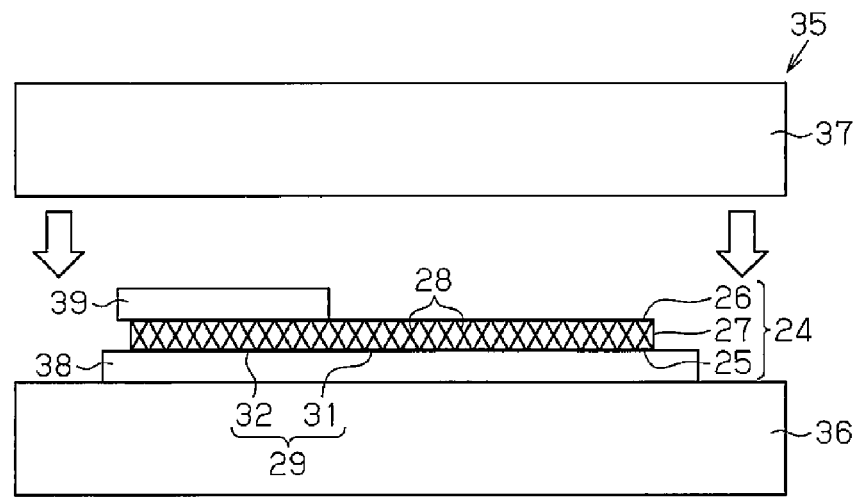
FIG. 4 is an explanatory schematic diagram illustrating a state where a peripheral edge portion of a terminal portion in a cushion layer is hot-pressed in the embodiment in FIG. 1.

When the hot pressing is implemented, a hot-pressing machine 35 shown in FIG. 4 is used. The hot-pressing machine 35 is provided with a fixed hot-pressing plate 36 and a movable hot-pressing plate 37. The movable hot-pressing plate 37 is located above the fixed hot-pressing plate 36 and is capable of moving vertically. On the fixed hot-pressing plate 36, a lower thermally conductive plate 38 is arranged, which is formed of a material having a higher thermal conductivity than the fixed hot-pressing plate 36, e.g., aluminum. On the lower thermally conductive plate 38, the cushion layer 24 is arranged in an upside-down state, that is, in a state where the back knitted fabric layer 26 is placed at the top and the top knitted fabric layer 25 is placed at the bottom. Further, at a location to be compressed (peripheral edge portion 32) in the terminal portion 29 of the cushion layer 24, an upper thermally conductive plate 39 is loaded. The upper thermally conductive plate 39 is formed of a material having a higher thermal conductivity than the movable hot-pressing plate 37, e.g., aluminum, similar to the lower thermally conductive plate 38. At a location not to be compressed (body portion 31) in the terminal portion 29 of the cushion layer 24, the upper thermally conductive plate 39 is not loaded.

Then, the fixed hot-pressing plate 36 and the movable hot-pressing plate 37 are heated and the movable hot-pressing plate 37 is lowered while heated. The movable hot-pressing plate 37 is then pressed against the upper thermally conductive plate 39 with a predetermined pressure for a predetermined time. In the present embodiment, where the connecting strands 28 are formed of polyethylene terephthalate fibers, it is preferable that the fixed hot-pressing plate 36 and the movable hot-pressing plate 37 are heated to approximately 200° C., which is slightly lower than the melting point (220° C.) of the connecting strands 28.

As a result of this pressing, as shown in FIG. 5, the peripheral edge portion 32 of the cushion layer 24 is hot-pressed from both sides in a thickness direction of the peripheral edge portion 32. As a result of this hot pressing, the peripheral edge portion 32 is heated and pressurized. When the peripheral edge portion 32 is compressed while being heated, at least some of the connecting strands 28 of the connection layer 27 corresponding to the peripheral edge portion 32 are plastically deformed to be laid flat.

Figure 8:
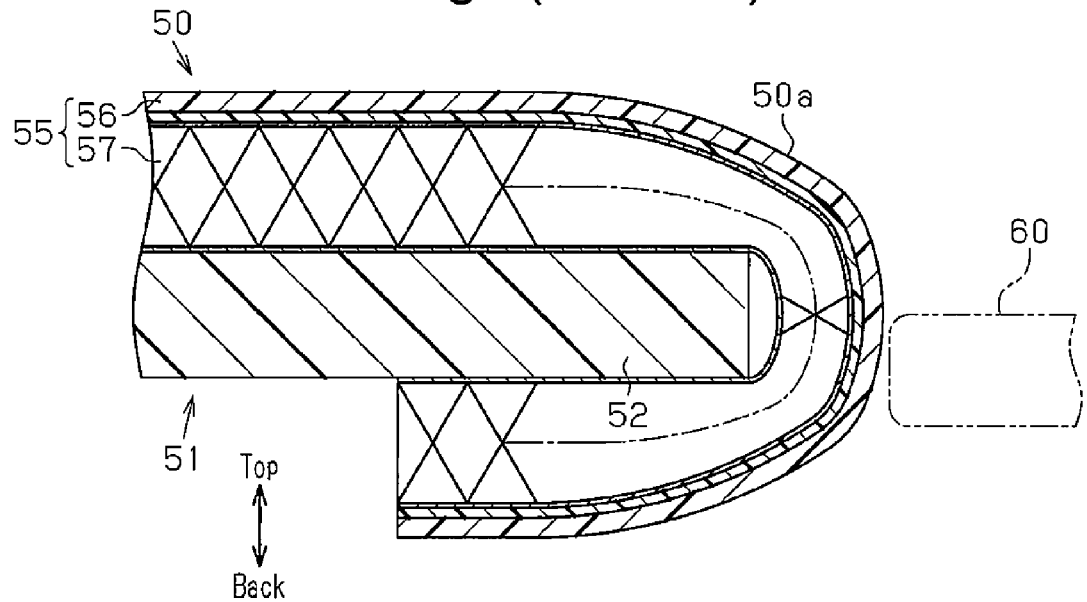
FIG. 8 is a partial cross-sectional view showing a terminal portion of a conventional product with a cover, together with an adjacent component.

The cover 20, which has the above-described cushion layer 24, is adhered, via the adhering of the cushion layer 24 to the substrate 15, onto the substrate 15, as shown in FIG. 3. More particularly, the body portion 31 of the cushion layer 24 is adhered onto the flat portion 17 of the substrate 15. Then, the peripheral edge portion 32 of the cushion layer 24 is adhered onto the flange portion 18 of the substrate 15. The peripheral edge portion 32 is adhered onto the flange portion 18 in a state where the peripheral edge portion 32 is folded along a top surface 18a, a side surface 18b, and a back surface 18c of the flange portion 18. That is, the peripheral edge portion 32 of the cushion layer 24 is adhered onto the substrate 15 in a state of covering the side surface 18b and the back surface 18c in the substrate 15. The cover body 21 is folded along a corner portion 18d at the top side of the flange portion 18 of the substrate 15, and as a result, the cover body 21 is curved with a radius of curvature approximately half the conventional radius of curvature (FIG. 8), that is, a radius of curvature of approximately 2.5 to 3.0 mm.

Figure 9:
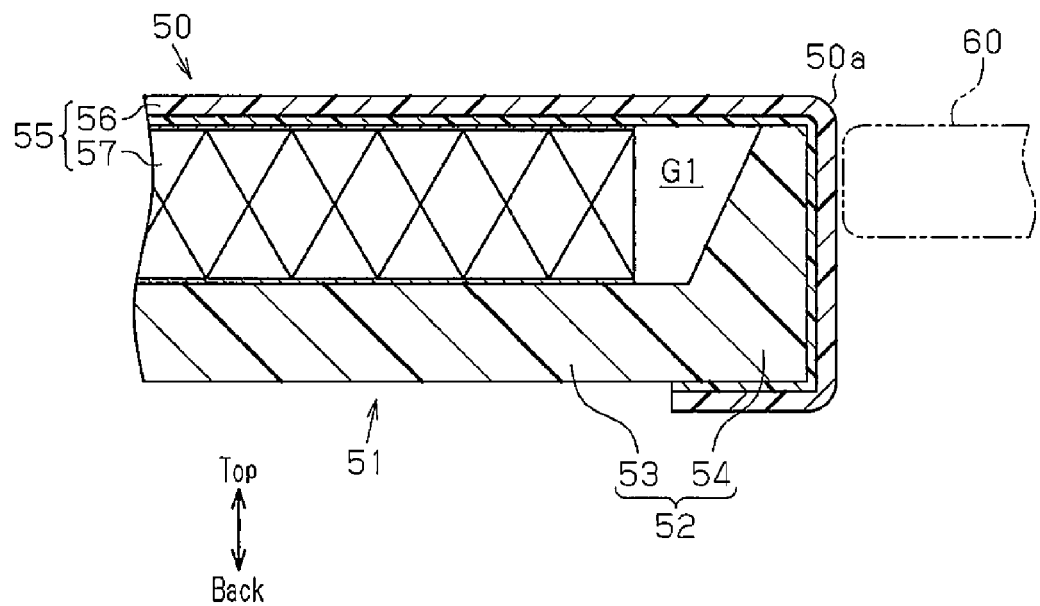
FIG. 9 is a partial cross-sectional view showing a terminal portion of a conventional product with a cover of a type different from that in FIG. 8, together with an adjacent component.

The cover 20 is manually adhered onto the substrate 15. During this adhering work, a gap G1 is formed to some degree between the body portion 31 and the flange portion 18. This point applies to the conventional case (FIG. 9).

Operation of the present embodiment, which is configured as described above, will now be described.

As shown in FIG. 3, the terminal portion of the panel 10, which is obtained by adhering the cover 20 onto the top surface of the substrate 15, has, between the flat portion 17 of the substrate 15 and the cover body 21, the body portion 31, which is not plastically deformed into a compressed state in the terminal portion 29 of the cushion layer 24. The body portion 31 imparts a necessary elasticity to the terminal portion of the panel 10.

Further the peripheral edge portion 32, which is plastically deformed into a compressed state in the terminal portion 29 of the cushion layer 24, is arranged between the corner portion 18d at the top side of the flange portion 18 in the substrate 15 and the cover body 21. The peripheral edge portion 32, which is plastically deformed into a compressed state, receives no elastic restoring force and is not easily bulged. Thus, as compared to a case where the peripheral edge portion 32 is bulged by the own elastic restoring force (see FIG. 8), the cover 20 is less likely to be bulged in the corner portion 18d at the top side of the flange portion 18 so that the cover 20 is curved with a large radius of curvature.

The peripheral edge portion 32 in a compressed state is arranged also between the top surface 18a (distal end surface) of the flange portion 18 and the cover body 21. If the protruding length L1 from the flat portion 17 in the flange portion 18 of the substrate 15 were set comparably to the thickness of the body portion 31 of the cushion layer 24, a part corresponding to the top side of the flange portion 18 in the cover 20 would swell out greatly by the thickness of the peripheral edge portion 32 toward the top side relative to the other parts, and a step would be formed in the cover 20 at the top side of the flange portion 18. However, in the present embodiment, the protruding length L1 is set smaller than the thickness of the body portion 31, and thus, the difference between the protruding length L1 and thickness of the body portion 31 absorbs at least a part of the swelling of the cover 20 by the peripheral edge portion 32. As a result, the step of the cover 20 is small.

Further, although compressed, the peripheral edge portion 32 still has a measurable elasticity. Therefore, when touched, for example, with a finger, the part corresponding to an area near the corner portion 18d at the top side of the flange portion 18 in the cover 20 feels soft as compared to a case where the cushion layer 24 (peripheral edge portion 32) is not provided.

Further, the peripheral edge portion 32 in a compressed state compensates for the rigidity of the cover body 21. Thus, even when a part of the cover body 21, that is, a part provided with the gap G1 between the flange portion 18 and the body portion 31 at the back of the part, is pressed by a finger or the like, the cover body 21 is not likely to expand.

The above described embodiment achieves the following advantages.

(1) In the panel 10, which is formed by adhering the cover 20 onto the top surface of the substrate 15, the terminal portion 29 of the cushion layer 24 of the cover 20 includes the body portion 31, which is not plastically deformed into a compressed state, and the peripheral edge portion 32, which is plastically deformed into a compressed state. The peripheral edge portion 32 is located around the body portion 31. Further, the terminal portion 16 of the substrate 15 includes the flat portion 17 and the flange portion 18. The flange portion 18 surrounds the flat portion 17 in a state of protruding to the top side relative to the flat portion 17. When the body portion 31 of the cushion layer 24 is adhered onto the flat portion 17 of the substrate 15 and the peripheral edge portion 32 of the cushion layer 24 is adhered onto the flange portion 18 of the substrate 15, the cover 20 is adhered onto the terminal portion of the substrate 15. The peripheral edge portion 32 is adhered onto the flange portion 18 in a state where the peripheral edge portion 32 is folded along at least the top surface 18a and the side surface 18b of the flange portion 18 (FIG. 3).

Thus, it is possible to prevent the cover 20 from being curved with a large radius of curvature as a result of bulging of a part corresponding to the corner portion 18d at the top side of the flange portion 18, and it is possible to ensure that the boundary with the air-conditioning register 11 (adjacent component) in the panel 10 (covered product) is clearly visible.

Further, it is possible to improve the tactile sensation obtained when a finger or the like touches the corner portion at the top side of the panel 10 by the elasticity of the peripheral edge portion 32 in a compressed state. Further, even when a part of the cover body 21, that is, a part provided with the gap G1 between the flange portion 18 and the body portion 31 at the back side of the part, is pressed by a finger or the like, the part is not likely to expand. Thus, it is possible to prevent the cover body 21 from being loosened or indented toward the gap G1.

Thus, it is possible to improve the tactile sensation and the appearance of the terminal portion of the panel 10.

(2) The protruding length L1 from the flat portion 17 of the flange portion 18 of the substrate 15 is set smaller than the thickness of the body portion 31 of the cover 20 (FIG. 3).

Therefore, it is possible to ensure that the step of the cover 20 appearing at the top side of the flange portion 18 is made smaller, hence not easily identified. As a result, it is possible to further improve the appearance of the terminal portion of the panel 10.

(3) When the peripheral edge portion 32 of the cushion layer 24 is hot-pressed from both sides in the thickness direction of the peripheral edge portion 32, the peripheral edge portion 32 is plastically deformed into a compressed state (FIG. 4).

Thus, when the peripheral edge portion 32 is heated and pressurized, it is possible to compress and plastically deform the peripheral edge portion 32 so that it is possible to maintain the peripheral edge portion 32 in a compressed state.

(4) As the cushion layer 24, a three-dimensionally knitted cushion layer is used. The three-dimensionally knitted cushion layer is provided with the top knitted fabric layer 25, the back knitted fabric layer 26, and the connection layer 27. The connection layer 27 is formed of the connecting strands 28 that connect the top knitted fabric layer 25 and the back knitted fabric layer 26 (FIG. 5).

Thus, as compared to a case where the cushion layer 24 is made of a woven fabric, it is possible to improve the stretchability and the flexibility of the cushion layer and those of the cover 20. Further, it is possible to improve the elasticity and the tactile sensation of the panel 10 as compared to a case where the cushion layer 24 is formed of urethane foam or the like.

(5) In the peripheral edge portion 32, at least some of the connecting strands 28 in the connection layer 27 are plastically deformed to be laid flat.

Therefore, when the connecting strands 28 are maintained to be laid flat, it is possible to ensure that the peripheral edge portion 32 of the cushion layer 24 is compressed.

(6) The panel 10 is constituted such that a part of the panel 10 is a part of an airbag device (airbag door 12). The thickness of the cover body 21 of the panel 10 is set to a thickness capable of being broken when being pressed by an airbag that is deployed and inflated in the airbag device.

Thus, although the cover body 21 does not have a tear line, it is possible to break the cover body 21 by being pressed by an airbag.

Further, the thickness of the cover body 21 is smaller than the thickness of the cover body of a type having a tear line, and thus, it is possible to reduce the cost of the cover body 21 and that of the panel 10.

The above illustrated embodiment may be modified as follows.

<Regarding Cover 20>

The cover 20 may be adhered onto the flange portion 18 in a state where the cover 20 is folded along at least the top surface 18a and the side surface 18b of the flange portion 18 in the peripheral edge portion 32. Therefore, the cover 20 does not always need to be adhered and folded along the back surface 18c of the flange portion 18.

<Regarding Cover Body 21>

The cover body 21 may be constituted without the base fabric layer 22 unlike the above-described embodiment. That is, the cover body 21 may be constituted only of the cover layer 23. The cover body 21 may include a single-layered structure. This modification is applicable to a case in which the cover body 21 is constituted of real leather.

<Regarding Cushion Layer 24>

Figure 6:
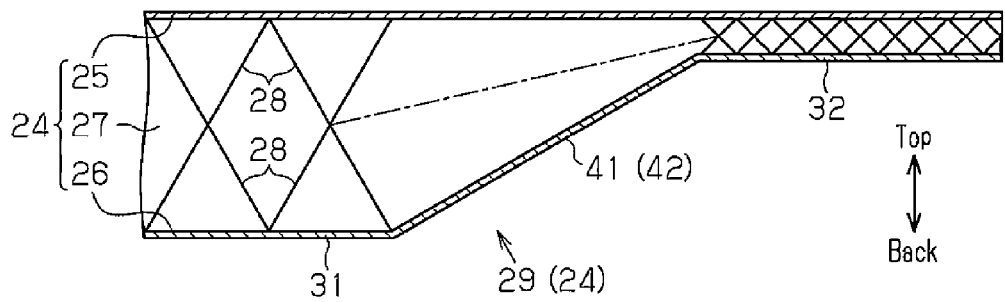
FIG. 6 is a partial cross-sectional view showing a modification in which a transition portion is formed in the peripheral edge portion of the cushion layer.

As shown in FIG. 6, in the boundary part with the body portion 31 of the peripheral edge portion 32, a transition portion 41 may be formed that is gradually decreased in thickness toward the peripheral edge portion 32 from the body portion 31. In this case, in the transition portion 41, the back knitted fabric layer 26 is inclined in relation to the top knitted fabric layer 25.

Figure 7A:
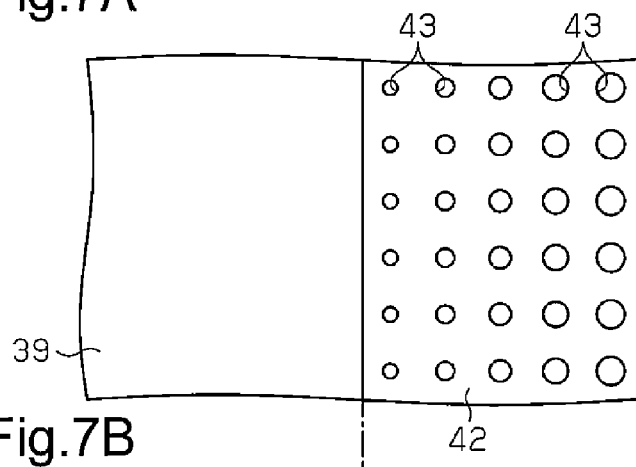
FIG. 7A is an explanatory partial bottom view of a state where the transition portion of FIG. 6 is formed, showing an upper thermally conductive plate.
Figure 7B:
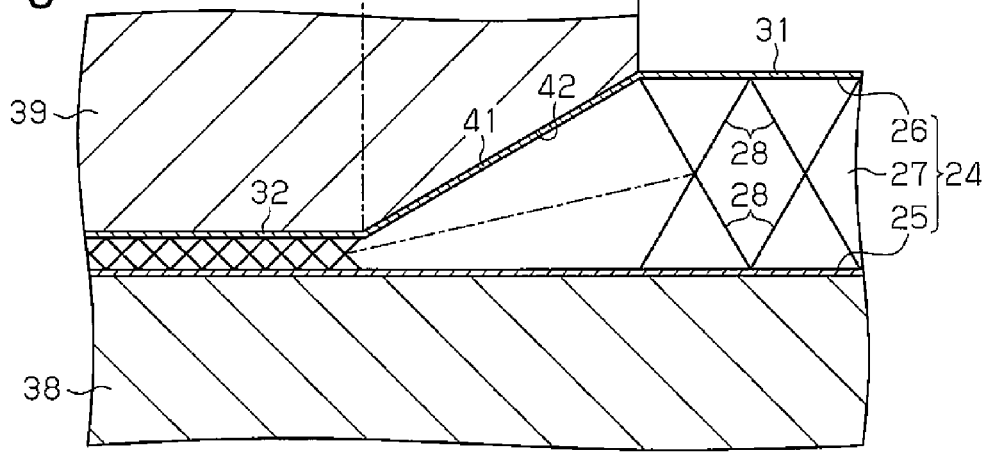
FIG. 7B is a partial cross-sectional view illustrating a state where the peripheral edge portion of the terminal portion is compressed by the upper thermally conductive plate in FIG. 7A so that the transition portion is formed.

In order to form the transition portion 41 in a part of the peripheral edge portion 32, an upper thermally conductive plate 39 may be used that has an inclined surface 42 inclined along the back knitted fabric layer 26, as shown in FIG. 7B.

In this case, as shown in FIG. 7A, the upper thermally conductive plate 39 may be provided with recesses 43 opened in the inclined surface 42 at separate locations. The opening area of the recesses 43 is set larger at a location where the thickness of the upper thermally conductive plate 39 is small (location on the right side of FIG. 7B), and set to decrease as the thickness increases (toward the left side of FIG. 7B).

The use of the upper thermally conductive plate 39 causes, when the peripheral edge portion 32 is hot-pressed, the peripheral edge portion 32 to be relatively weakly compressed at the location where the recesses 43 having a large opening area are formed. At the location where the recesses 43 having a small opening area are formed, the peripheral edge portion 32 is compressed relatively strongly. This enables the formation of the transition portion 41 in the boundary part with the body portion 31 of the peripheral edge portion 32.

The cushion layer 24 may be adhered onto the cover body 21 after the peripheral edge portion 32 is compressed and plastically deformed by hot pressing as shown in FIG. 5. On the contrary, after the cushion layer 24 is adhered onto the cover body 21, the peripheral edge portion 32 may be compressed and plastically deformed by hot pressing.

In the former case where the adhering work is performed after the compression of the cushion layer 24, the heat by the hot pressing is not applied to the cover body 21, and thus, the appearance of the cover body 21 is not likely to receive the influence of the heat. In contrast, positioning is difficult when the cushion layer 24 is adhered to the cover body 21.

In the latter case, where the compression work is performed after the adhering of the cushion layer 24, it is unnecessary to position the cushion layer 24 relative to the cover body 21 if a predetermined shape is punched after the cushion layer 24 is adhered onto the cover body 21. However, in the hot pressing performed subsequently, the appearance of the cover body 21 receives the influence of the heat and the ornamental quality may thereby deteriorate. Therefore, it becomes difficult to manage the heat when the hot pressing is performed.

Therefore, it is preferable that the order of implementing the hot pressing and the adhering be determined in consideration of the above-described advantages and disadvantages.

In order to form the peripheral edge portion 32 in the terminal portion 29 of the cushion layer 24, a part where the peripheral edge portion 32 is formed may be compressed by the normal pressing, in which pressurization is performed without applying heat, instead of the hot pressing. In this case, a process of maintaining a compressed state even when the external force is removed is also performed at the same time. For example, adhesive or the like may be injected to a part where the peripheral edge portion 32 is formed in the terminal portion 29, and the part may be pressed in this state.

In the peripheral edge portion 32, only some of the connecting strands 28 of the connection layer 27 may be plastically deformed to be laid flat. Also, all the connecting strands 28 may be plastically deformed to be laid flat.

The three-dimensionally knitted cushion layer constituting the cushion layer 24 may be formed of a knitted fabric different from a double raschel knitted fabric, e.g., a tricot knitted fabric.

As the cushion layer 24, a cushion layer made of a foam material such as urethane foam, ethylene foam, and propylene foam may be used instead of the three-dimensionally knitted cushion layer. These foam materials are characterized by being soft with continuous pores and having restorability.

<Regarding Hot Pressing>

The peripheral edge portion 32 of the cushion layer 24 may be compressed and plastically deformed by being hot-pressed from one side only of the opposite sides in the thickness direction of the peripheral edge portion 32.

<Other Modifications>

It is possible to apply the structure of a terminal portion of a product with a cover to an automobile interior part other than the panel 10.

It is possible to apply the structure of a terminal portion of a product with a cover not only to the automobile interior part, but also to a wide variety of products having a cover on the top surface.

The invention claimed is:

1. A structure of a terminal portion of a covered product, the structure being applied to a product that includes a substrate and a cover formed by laminating a cushion layer on a back surface of a cover body, and the cover is adhered onto a top surface of the substrate, wherein
a terminal portion of the cushion layer includes a body portion not plastically deformed into a compressed state and a peripheral edge portion plastically deformed into a compressed state,
the peripheral edge portion is located around the body portion,
a terminal portion of the substrate includes a flat portion and a flange portion,
the flange portion surrounds the flat portion in a state of protruding to the top side relative to the flat portion,
the cover is adhered onto the terminal portion of the substrate by adhering the body portion of the cushion layer onto the flat portion of the substrate and adhering the peripheral edge portion of the cushion layer onto the flange portion of the substrate, and the peripheral edge portion is adhered onto the flange portion in a state where the peripheral edge portion is folded along at least a top surface and a side surface of the flange portion.

2. The structure of a terminal portion of a covered product according to claim 1, wherein a protruding length of the substrate flange portion from the flat portion is set to be smaller than a thickness of the body portion of the cushion layer.

3. The structure of a terminal portion of a covered product according to claim 1, wherein the peripheral edge portion of the cushion layer is hot-pressed from at least one of opposite sides in a thickness direction of the peripheral edge portion to be plastically deformed into a compressed state.

4. The structure of a terminal portion of a covered product according to claim 1, wherein the cushion layer is a three-dimensionally knitted cushion layer, the three-dimensionally knitted cushion layer includes a top knitted fabric layer, a back knitted fabric layer, and a connection layer, and the connection layer is formed by connecting strands for connecting the top knitted fabric layer and the back knitted fabric layer.

5. The structure of a terminal portion of a covered product according to claim 4, wherein in the peripheral edge portion of the cushion layer, at least some of the connecting strands of the connection layer are plastically deformed to be laid flat.

6. The structure of a terminal portion of a covered product according to claim 1, wherein the covered product constitutes a part of an airbag device, and a thickness of the cover body is set to a thickness that allows the cover body to be broken by being pressed by an airbag that is deployed and inflated in the airbag device.

* * * * *